(12) United States Patent
Yilbas et al.

(10) Patent No.: US 8,613,983 B2
(45) Date of Patent: Dec. 24, 2013

(54) METHOD OF LASER SURFACE TREATING PRE-PREPARED ZIRCONIA SURFACES

(75) Inventors: Bekir Sami Yilbas, Dhahran (SA); Syed Sohail Akhtar, Kfupm (SA); Cihan Karatas, Ankara (TR)

(73) Assignee: King Fahd University of Petroleum and Minerals, Dhahran (SA)

( * ) Notice: Subject to any disclaimer, the term of this patent is extended or adjusted under 35 U.S.C. 154(b) by 338 days.

(21) Appl. No.: 13/197,485

(22) Filed: Aug. 3, 2011

(65) Prior Publication Data
US 2013/0034665 A1 Feb. 7, 2013

(51) Int. Cl.
 B05D 3/02 (2006.01)
 B05D 3/00 (2006.01)
 C08J 7/18 (2006.01)
 C23C 14/30 (2006.01)

(52) U.S. Cl.
 USPC .......... 427/554; 427/227; 427/228; 427/553; 427/557; 427/596

(58) Field of Classification Search
 USPC ................. 427/227, 228, 553, 554, 557, 596
 See application file for complete search history.

(56) References Cited

U.S. PATENT DOCUMENTS

| | | | |
|---|---|---|---|
| 4,784,839 A * | 11/1988 | Bachelard et al. ............ | 423/290 |
| 5,294,264 A | 3/1994 | Tiegs et al. | |
| 5,413,641 A | 5/1995 | Coulon | |
| 5,902,420 A | 5/1999 | Wissenbach et al. | |
| 5,927,207 A | 7/1999 | Ghosh et al. | |
| 6,344,411 B1 | 2/2002 | Yamada et al. | |
| 2010/0035051 A1 | 2/2010 | Yilbas et al. | |
| 2010/0285236 A1 | 11/2010 | Yilbas et al. | |
| 2010/0291318 A1 | 11/2010 | Yilbas et al. | |

FOREIGN PATENT DOCUMENTS

| | | |
|---|---|---|
| CN | 1603238 A | 4/2005 |
| GB | 2336440 A | 10/1999 |
| JP | 7277860 A | 10/1995 |
| JP | 11140622 A | 5/1999 |
| WO | WO8706928 A1 | 11/1987 |

OTHER PUBLICATIONS

Kathuria; Physical aspects of laser nitriding of yttria stabilized t-zirconia; Applied Surface Science 254; pp. 937-941; Aug. 21, 2007.*

Yilbas et al; Laser gas-assisted processing of carbon coated and TiC embedded Ti—6Al—4V alloy surface; Applied Surface Science; pp. 531-537; Jul. 16, 2010.*

Ani Zhecheva, Wei Sha, Savko Malinov and Adrian Long, Enhancing the microstructure and properties of titanium alloys through nitriding and other surface engineeting methods, *Surface and Coatings Technology*, vol. 200, Issue 7, Dec. 21, 2005, pp. 2192-2207.

* cited by examiner

*Primary Examiner* — Michael Wieczorek
(74) *Attorney, Agent, or Firm* — Richard C. Litman

(57) ABSTRACT

The method of laser surface treating pre-prepared zirconia surfaces provides for applying an organic resin in a thin, uniform film to a zirconia surface; maintaining the resin-coated zirconia surface in a controlled chamber at approximately 8 bar pressure at a temperature of approximately 175 degrees Centigrade for approximately 2 hours; heating the resin-coated zirconia surface to approximately 400 degrees Centigrade in an inert gas atmosphere, thereby converting the organic resin to carbon; and irradiating the carbon-coated zirconia surface with a laser beam while applying nitrogen under pressure, thereby forming a zirconium carbonitride coating.

12 Claims, 3 Drawing Sheets

METHOD OF LASER SURFACE TREATING PRE-PREPARED ZIRCONIA SURFACES

BACKGROUND OF THE INVENTION

1. Field of the Invention

The present invention relates to ceramics, and particularly to a method of laser surface treating pre-prepared zirconia surfaces, including yttria-supported zirconia, in order to harden the surfaces.

2. Description of the Related Art

Carbonitriding is a metallurgical surface modification technique that is used to increase the surface hardness of a metal, thereby reducing wear. During the process, atoms of carbon and nitrogen diffuse interstitially into the metal, creating barriers to slip, and increasing the hardness and modulus near the surface. Carbonitriding is often applied to inexpensive, easily machined low-carbon steel to impart the surface properties of more expensive and difficult to work grades of steel. Surface hardness of carbo-nitrided parts ranges from 55 to 62 HRC. An economical carbonitriding process applicable to zirconia might also address surface hardness issues for zirconia.

Laminates or composites produced by zirconia and yttria powders contain fine pores, which affect the structural homogeneity of the laminates and composites. Zirconia ($ZrO_2$) is usually doped with small fraction (2-3%) of yttria ($Y_2O_3$) to conserve $ZrO_2$ cubic (c-$ZrO_2$) or tetragonal (t-$ZrO_2$) high temperature phases down to room temperature. Surface treatment of yttria-stabilized tetragonal zirconia enhances the surface properties, such as corrosion and wear resistance, and improves the structural integrity at the surface through re-melting. The use of high energy lasers for surface treatment of such materials would offer considerable advantages, including local treatment, short processing time, and precise operation. Laser nitrogen gas-assisted processing of the surface could provide for the formation of zirconia nitride (ZrN) in the surface region. This would further improve the wear resistance of the surface, which would make it possible to use the treated surface in the cutting tool industry and hardness required other applications. Injecting particles during laser gas assisted processing modifies the surface chemistry and microstructure at the surface. The formation of zirconium carbide (ZrC) at the surface is desirable, since it is non-oxide ceramic with mixed ionic and metallic bonding, as well as high hardness.

Thus, a method of laser surface treating pre-prepared zirconia surfaces solving the aforementioned problems is desired.

SUMMARY OF THE INVENTION

The method of laser surface treating pre-prepared zirconia surfaces involves nitriding a zirconia surface in the presence of titanium carbide (TiC) particles at the surface.

The method involves pre-treating the zirconia surface, which may be a yttria-stabilized tetragonal zirconia surface, by coating the surface with a phenoic resin containing about 5-7% titanium carbide particles by volume at high pressure and temperature to form a carbon film about 50 μm thick on the surface, and then scanning the surface with a high pressure nirogen-assisted laser to form a carbonitrided surface. This produces a hard surface resistant to fracture and cracks.

These and other features of the present invention will become readily apparent upon further review of the following specification and drawings.

DETAILED DESCRIPTION OF THE PREFERRED EMBODIMENTS

The method of laser surface treating pre-prepared zirconia surfaces involves the addition of fine carbon layer containing TiC particles at the tile surface, typically 50 μm thickness and 5-7% TiC particles. Subsequently, laser scanning of the coated tile surface at a constant speed, typically 0.1 m/s, is performed in the presence of nitrogen gas under high pressure. Although nitrogen is very stable and inert at normal ambient condition, it undergoes reaction with zirconia ($ZrO_2$, also called zirconium dioxide) to form zirconium nitride (ZrN) at elevated temperatures, e.g., at around the melting temperature. In addition, $ZrO_2$ is more thermodynamically stable than ZrN, since the Gibbs free energy at standard ambient conditions for ZrN is $\Delta G_0 = -315$ kJ/mol, while it is $-1020$ kJ/mol for $ZrO_2$. Therefore, to form ZrN, oxygen ($O_2$) has to be removed from zirconia through the dissociative process. This takes place in the following manner:

$t\text{-}ZrO_2 \rightarrow c\text{-}ZrO_2$ and $ZrO_2 + N_2 \rightarrow ZrN + 2O_2$ while forming the vacancies in the zirconia. The formation of zirconium carbide (ZrC) is observed from the X-ray diffractogram. This can be attributed to the presence of carbon film, which was formed at the zirconia surface prior to the laser treatment process. In this case, zirconium carbide of cubic syngony with lattice parameter $\alpha = 476$ Å will be formed through the reaction:

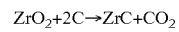
$ZrO_2 + 2C \rightarrow ZrC + CO_2$

The carbon dioxide gas formed after the reaction escapes from the surface. However, some of the carbon dioxide gas may be trapped in the surface vicinity contributing to the formation of voids in this region. Emanating from this understanding, the present method provides an effective method for laser gas-assisted nitriding of zirconia surfaces.

Figure 1:
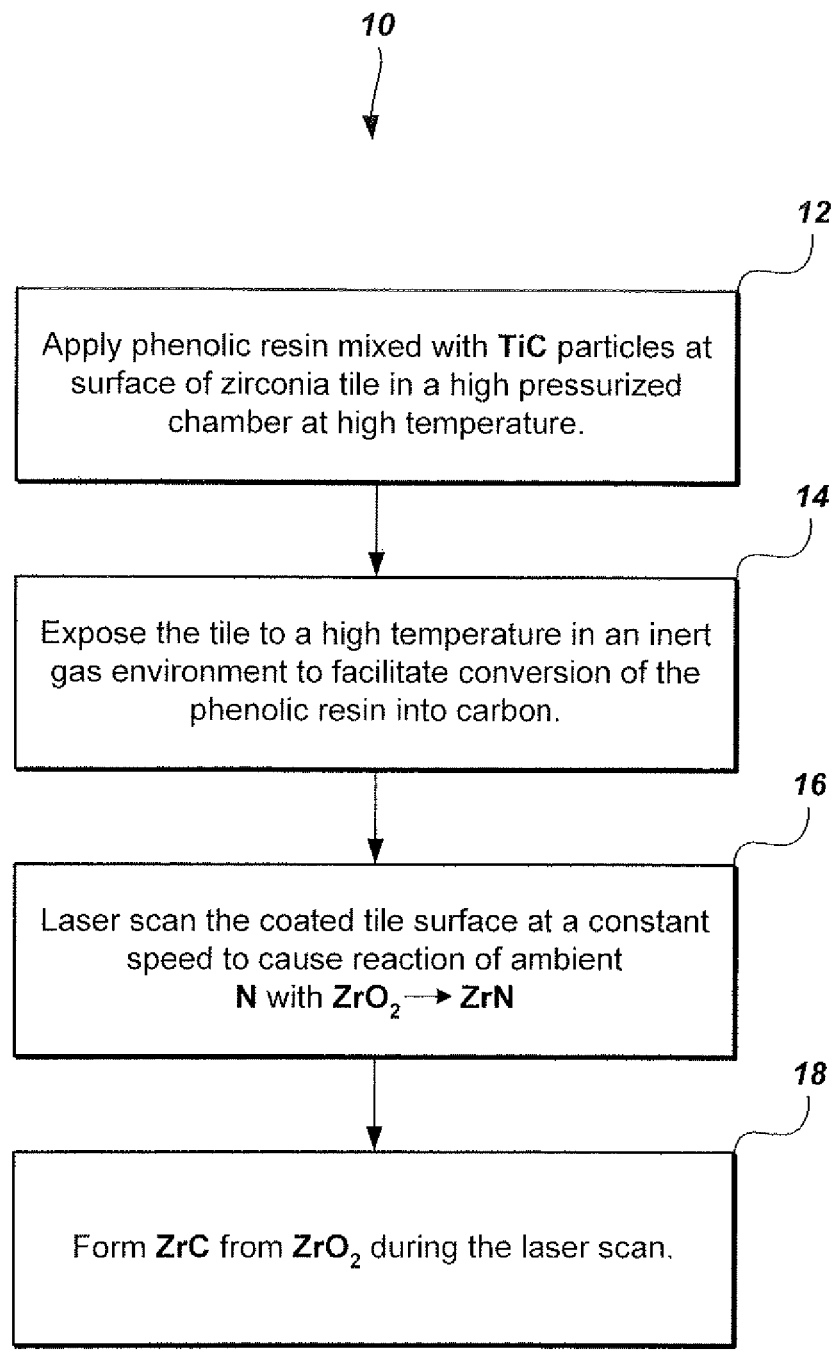
FIG. 1 is a flowchart showing the steps in a method of laser surface treating pre-prepared zirconia surfaces according to the present invention.

The steps of the method of laser surface treating pre-prepared zirconia surfaces are briefly illustrated in the flowchart 10 of FIG. 1. In the first step 12, titanium carbide (TiC) particles (e.g., a powder of about 400 nm particle size) are mixed with a phenolic resin, for example, 5% by volume, and the resin is applied to the zirconia surface, e.g., a yttria-stabilized zirconia tile 20. A uniform phenolic resin thickness, for example 50 micrometers, is achieved at the tile surface in a control chamber at high pressure, e.g., at 8 bar pressure, and at high temperature, for example 175° C., for some time, e.g., two hours. At step 14, the zirconia workpieces are then heated at high temperature, for example 400° Centigrade, in an inert gas environment, e.g., argon, for several hours to ensure the conversion of the phenolic resin into carbon.

At step 16, the yttria-stabilized zirconia tiles with carbon film containing 5% TiC particles are scanned by a $CO_2$ nitrogen gas-assisted laser beam, i.e., a stream of nitrogen gas under pressure is released from a nozzle coaxially around the laser beam. The carbon coating of the tile surface is necessary to form $Zr(C, N)$ compounds at the surface vicinity. During the laser treatment process, two reactions take place. In the first reaction (step 16), laser scanning forms ZrN component through the reaction:

$$t\text{-}ZrO_2 \rightarrow c\text{-}ZrO_2 \text{ and } ZrO_2+N_2 \rightarrow ZrN+2O_2$$

and in the second reaction, at step 18, the presence of carbon film forms ZrC through the reaction:

$$ZrO_2+2C \rightarrow ZrC+CO_2$$

Figure 2:
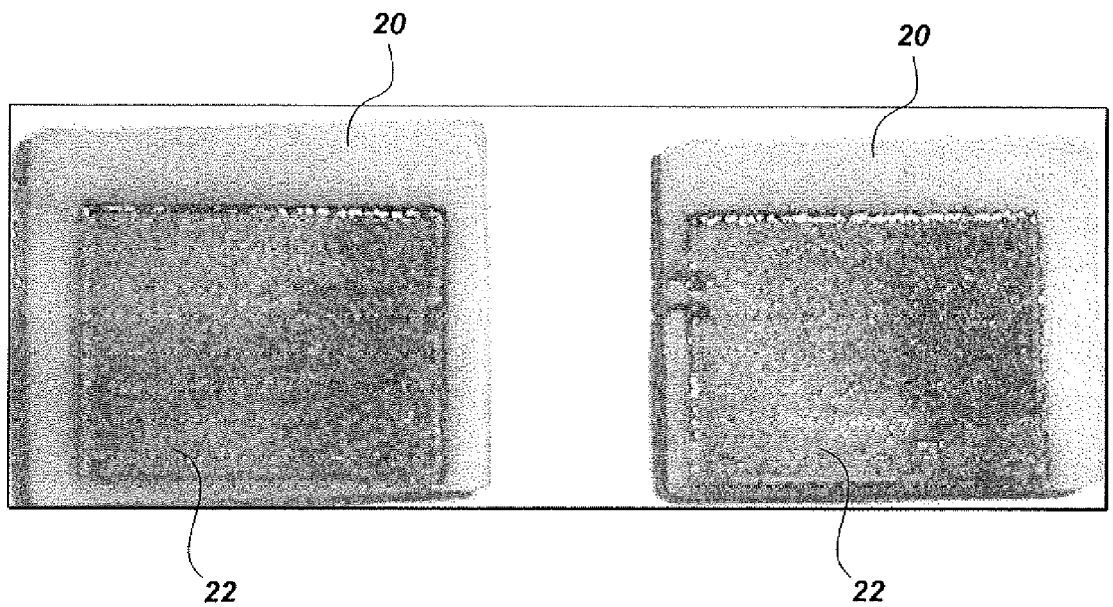
FIG. 2 is a plan view showing the contrast between untreated and laser-treated zirconia surfaces according to the present invention.
Figure 3:
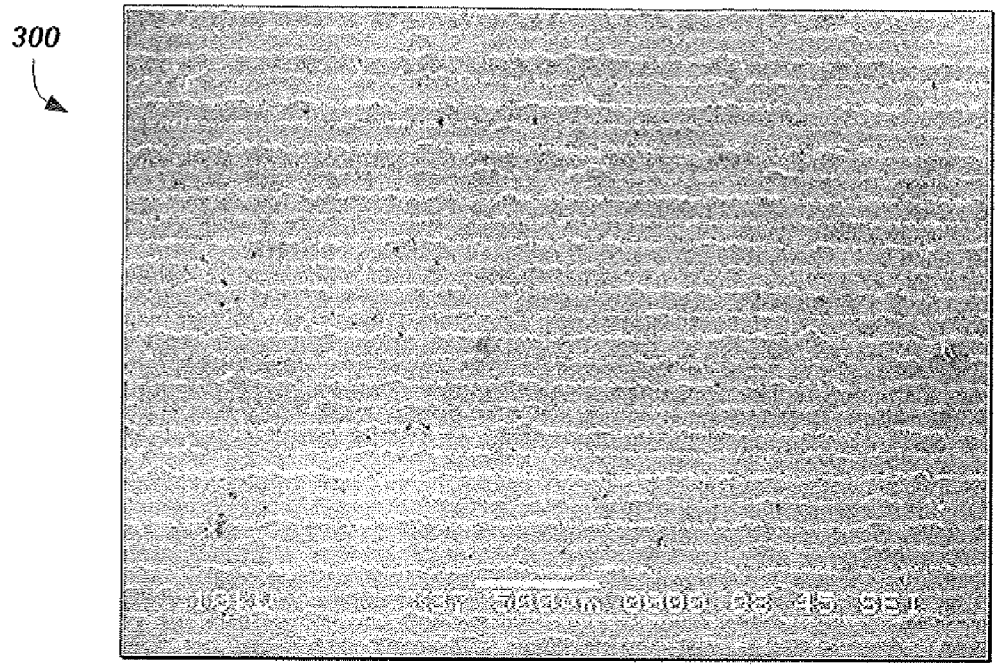
FIG. 3 is a scanning electron micrograph showing a zirconia surface after laser scanning by the method of laser surface treating pre-prepared zirconia surfaces according to the present invention.
Figure 4:
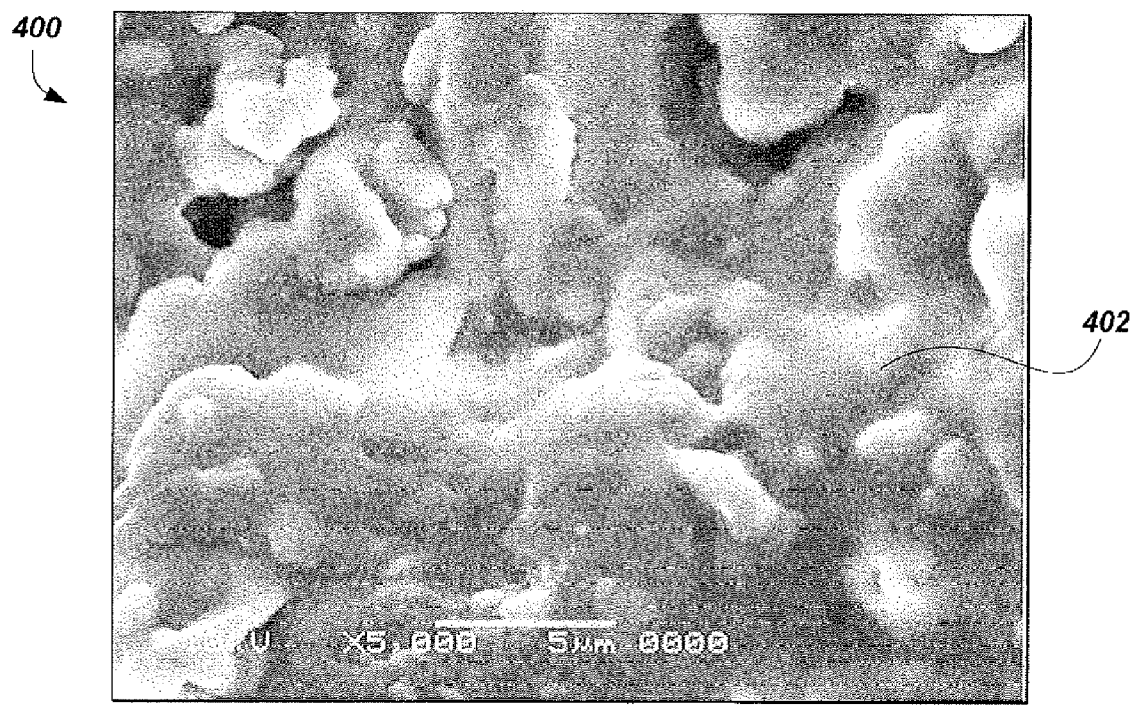
FIG. 4 is a scanning electron micrograph showing a cross section a zirconia surface laser treated by the method of laser surface treating pre-prepared zirconia surfaces according to the present invention in the vicinity of the zirconia surface.

The contrast between the untreated zirconia surface 20 and the laser-irradiated zirconia tile 22 is shown in FIG. 2. As shown in FIG. 3, the SEM micrograph 300 illustrates the top surface of the carbonitrided zirconia tile. As shown in FIG. 4, another SEM micrograph 400 details a cross-section of the laser-treated tile 22 near its surface. It can be observed that the laser-treated surface contains partially dissolved TiC particles 402 and exhibits a dense layer that is free from surface defects, such as cracks, voids, and cavities.

Although the present method is particularly useful for yttria-stabilized zirconia, due to the physics associated with the processes, the method is likely to work for other zirconia-based composites.

It is to be understood that the present invention is not limited to the embodiments described above, but encompasses any and all embodiments within the scope of the following claims.

We claim:

1. A method of laser surface treating a pre-prepared yttria-stabilized zirconia surface, comprising the steps of:
    applying a coating of a phenolic resin containing particles of titanium carbide (TiC) to the yttria-stabilized zirconia surface to form a carbon film on the surface; and
    scanning the coated surface with a nitrogen gas-assisted $CO_2$ laser beam in order to carbonitride the yttria-stabilized zirconia surface.

2. The method of laser surface treating a pre-prepared yttria-stabilized zirconia surface according to claim 1, wherein the particles of TiC are about 400 nm in size.

3. The method of laser surface treating a pre-prepared yttria-stabilized zirconia surface according to claim 1, wherein the particles of TiC comprise between about 5% and 7% of the phenolic resin coating by volume.

4. The method of laser surface treating a pre-prepared yttria-stabilized zirconia surface according to claim 1, wherein the step of applying the coating comprises applying the coating at a pressure of about 8 bar and a temperature of about 175° C. for about 2 hours.

5. The method of laser surface treating a pre-prepared yttria-stabilized zirconia surface according to claim 4, wherein the step of applying the coating further comprises heating the surface at about 400° C. for several hours in an inert gas atmosphere.

6. The method of laser surface treating a pre-prepared yttria-stabilized zirconia surface according to claim 4, wherein the carbon film has a thickness of about 50 μm.

7. A method of laser surface treating pre-prepared zirconia surfaces, comprising the steps of:
    applying an organic resin in a thin, uniform film to a zirconia surface;
    maintaining the resin-coated zirconia surface in a controlled chamber at approximately 8 bar pressure at a temperature of approximately 175° C. for about 2 hours;
    heating the resin-coated zirconia surface to approximately 400° C. in an inert gas atmosphere, thereby converting the organic resin to carbon; and
    irradiating the carbon coated zirconia surface with a laser beam while applying nitrogen under pressure, whereby a carbonitride coating is formed on the zirconia surface.

8. The method of laser surface treating pre-prepared zirconia surfaces according to claim 7, wherein the organic resin contains titanium carbide (TiC) particles.

9. The method of laser surface treating pre-prepared zirconia surfaces according to claim 7, wherein the organic resin comprises a phenolic resin.

10. The method of laser surface treating pre-prepared zirconia surfaces according to claim 9, further comprising applying the phenolic resin to the zirconia surface in a film having a thickness of about 50 μm.

11. A method of laser surface treating pre-prepared zirconia surfaces, comprising the steps of:
    applying a coating of carbon to a zirconia surface; and
    irradiating the carbon coated zirconia surface with a laser beam while applying nitrogen under pressure so that zirconium in the zirconia surface bonds with the nitrogen and carbon to form an zirconium carbonitride coating, and so that oxygen in the zirconia bonds with the carbon to remove the oxygen as carbon dioxide in order to prevent highly exothermic oxidation reactions during the carbonitriding process.

12. The method of laser surface treating pre-prepared zirconia surfaces according to claim 11, wherein the thin coating of carbon contains titanium carbide (TiC) particles.

\* \* \* \* \*